United States Patent
Gopalraj et al.

(10) Patent No.: US 8,108,403 B2
(45) Date of Patent: Jan. 31, 2012

(54) USER ENGAGEMENT DURING LARGE FILE UPLOADS

(75) Inventors: Ramajeyam Gopalraj, Morrisville, NC (US); David Mark Wendt, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 12/418,042

(22) Filed: Apr. 3, 2009

(65) Prior Publication Data

US 2010/0257199 A1 Oct. 7, 2010

(51) Int. Cl.
*G06F 17/30* (2006.01)

(52) U.S. Cl. ......................... 707/748; 709/203

(58) Field of Classification Search ........................ None
See application file for complete search history.

(56) References Cited

U.S. PATENT DOCUMENTS

| | | | |
|---|---|---|---|
| 6,973,491 B1 | 12/2005 | Staveley et al. | |
| 7,051,003 B1 | 5/2006 | Kobata et al. | |
| 2003/0195947 A1 | 10/2003 | Tanimoto | |
| 2005/0080872 A1 | 4/2005 | Davis et al. | |
| 2007/0083527 A1 * | 4/2007 | Wadler et al. | 707/10 |
| 2007/0143277 A1 * | 6/2007 | Van De Laar et al. | 707/5 |
| 2007/0157252 A1 * | 7/2007 | Perez | 725/61 |
| 2008/0133678 A1 * | 6/2008 | Woodham et al. | 709/206 |
| 2008/0256255 A1 * | 10/2008 | Mordovskoi et al. | 709/231 |
| 2009/0055270 A1 * | 2/2009 | Magdon-Ismail et al. | 705/14 |
| 2009/0094652 A1 * | 4/2009 | Al Adham et al. | 725/103 |
| 2009/0300475 A1 * | 12/2009 | Fink et al. | 715/230 |

OTHER PUBLICATIONS

A. Fabian et al., "Designing the Claims Reuse Library: Validating Classification Methods for Notification Systems" ACM-SE 42: Proceedings of the 42nd annual Southeast regional conference, Apr. 2004, pp. 357-362.

V. Subramanian et al., "Impact of Interference and Capture Effects in 802.11 Wireless Networks on TCP" 2nd International Workshop on Wireless Traffic Measurements and Modeling, Aug. 5, 2006, Boston, MA, USA, pp. 1-6.

M. McNett et al, "Access and Mobility of Wireless PDA Users" ACM Sigmobile Mobile Computing and Communications Review, vol. 9, No. 2, Apr. 2005, New York, NY, USA, pp. 40-55.

J. Lee, "An End-User Perspective on File-Sharing Systems" Communications of the ACM, vol. 46, No. 2, Feb. 2003, pp. 49-53.

* cited by examiner

*Primary Examiner* — Cheryl Lewis
*Assistant Examiner* — Scott A Waldron
(74) *Attorney, Agent, or Firm* — Jeanine S. Ray-Yarletts; Law Office of Jim Boice

(57) ABSTRACT

A content server receives metadata describing content that is to be uploaded from a client computer to the content server. A prediction is made as to how long it will take to upload and/or process the content. Based on this predication, an appropriate-length user engagement content is transmitted to the client computer for a user to view while the content is being uploaded and/or processed.

11 Claims, 3 Drawing Sheets

USER ENGAGEMENT DURING LARGE FILE UPLOADS

BACKGROUND OF THE INVENTION

1. Technical Field

The present disclosure relates to the field of computers, and specifically to content sharing. Still more particularly, the present disclosure relates to uploading content to a server.

2. Description of the Related Art

Initially, computers were standalone machines that did not interact with other computers. However, with the advent of networks, including the Internet, modern computers now interact with other computers in order to share resources, including their content. A recent development in content sharing is the uploading of videos, photos and large documents, which often are created by private individuals, from a client computer to a content server. The content server, which may be managed by a content sharing service, then makes the uploaded content available to other users. Such uploaded content may be several megabytes in size, thus requiring from several minutes to over an hour to complete the uploading process.

SUMMARY OF THE INVENTION

A content server receives metadata describing content that is to be uploaded from a client computer to the content server. A prediction is made as to how long it will take to upload and/or process the content. Based on this predication, an appropriate-length user engagement content is transmitted to the client computer for a user to view while the content is being uploaded and/or processed.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
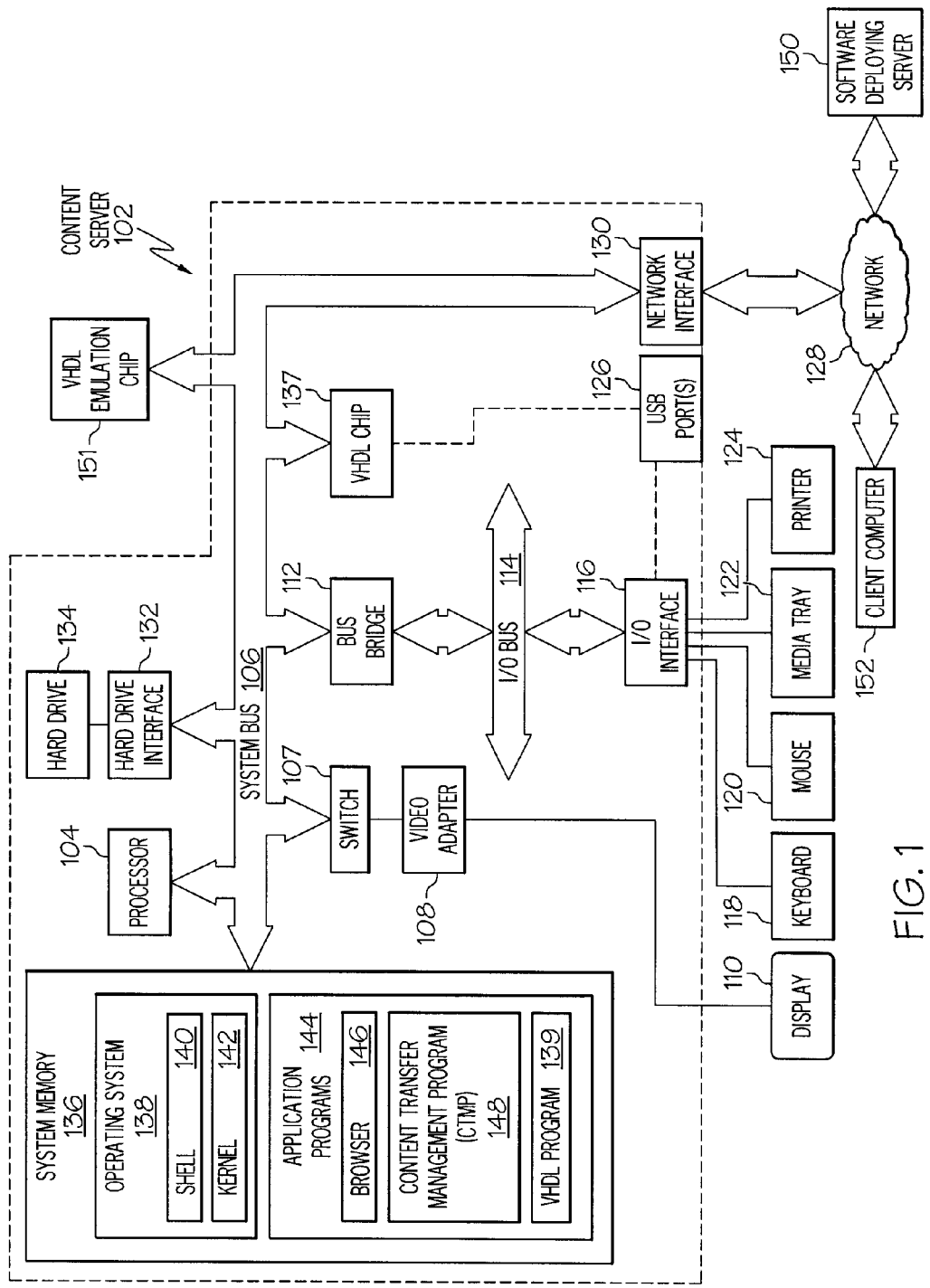
FIG. 1 depicts an exemplary computer in which the present invention may be implemented.

With reference now to the figures, and in particular to FIG. 1, there is depicted a block diagram of an exemplary content server 102, which may be utilized by the present invention. Note that some or all of the exemplary architecture, including both depicted hardware and software, shown for and within content server 102 may be utilized by a software deploying server 150 and a client computer 152.

Content server 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., content transfer management program—CTMP 148 described below) that support the processes described herein.

System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of content server architecture, in a preferred embodiment some or all of these ports are universal serial bus (USB) ports.

As depicted, content server 102 is able to communicate with a software deploying server 150 and a client computer 152 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in content server 102. This volatile memory includes additional higher levels of volatile memory (not shown), including, but not limited to, cache memory, registers and buffers. Data that populates system memory 136 includes content server 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., content server 102) to send and receive network messages to the Internet using hypertext transfer protocol (HTTP) messaging, thus enabling communication with software deploying server 150 and other described content server systems.

Application programs 144 in content server 102's system memory (as well as software deploying server 150's system memory) also include a content transfer management program (CTMP) 148. CTMP 148 includes code for implementing the processes described below, including those described in FIGS. 2-3. CTMP 148 includes, but is not limited to, instructions used by the client computer 152 to upload client content to the content server 102, and instructions used by the content server 102 to send user engagement content to the client computer 152, in a manner described in exemplary details below.

In one embodiment, content server 102 is able to download CTMP 148 from software deploying server 150, including in an on-demand basis. Note further that, in one embodiment of the present invention, software deploying server 150 performs all of the functions associated with the present invention (including execution of CTMP 148), thus freeing content server 102 from having to use its own internal computing resources to execute CTMP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from CTMP 148 causes VHDL program 139 to configure VHDL chip 137, which may be an FPGA, ASIC, etc.

In another embodiment of the present invention, execution of instructions from CTMP 148 results in a utilization of VHDL program 139 to program a VHDL emulation chip 151. VHDL emulation chip 151 may incorporate a similar architecture as described above for VHDL chip 137. Once CTMP 148 and VHDL program 139 program VHDL emulation chip 151, VHDL emulation chip 151 performs, as hardware, some or all functions described by one or more executions of some or all of the instructions found in CTMP 148. That is, the VHDL emulation chip 151 is a hardware emulation of some or all of the software instructions found in CTMP 148. In one embodiment, VHDL emulation chip 151 is a programmable read only memory (PROM) that, once burned in accordance with instructions from CTMP 148 and VHDL program 139, is permanently transformed into a new circuitry that performs the functions needed to perform the process described below in FIGS. 2-3.

Note that the hardware and software described in FIG. 1 may be specifically used in one embodiment of a system that implements the present invention. For example, when utilized in conjunction with CTMP 148 by content server 102, a combination of processor 104 and network interface 130 may function as exemplary first receiving logic for receiving client content metadata, wherein the client content metadata describes a size of a client content that is to be uploaded from a client computer to the content server; processor 104 may function as exemplary first utilization logic for utilizing the client content metadata to determine a predicted upload time length for the client computer to upload the client content to the content server; processor 104 may function as exemplary first selection logic for selecting a first user engagement content, wherein the first user engagement content has a first presentation time length that is equivalent to the predicted upload time length, and wherein the first presentation time length is used as a first criterion for selecting the first user engagement content; and processor 104 and network interface 130 may function as exemplary first transmission logic for transmitting the first user engagement content from the content server to the client computer, wherein the first user engagement content is displayed on the client computer while the client computer is uploading the client content to the content server.

In one embodiment, processor 104 and network interface 130 may function as exemplary second receiving logic for receiving a client computer's specifications for the client computer; processor 104 may function as exemplary second utilization logic for utilizing the client computer's specifications to determine a refined predicted upload time length for uploading the client content; and processor 104 may function as exemplary third utilization logic for utilizing the refined predicted upload time length as a second criterion for selecting the first user engagement content.

In one embodiment, processor 104 may function as exemplary second utilization logic for utilizing the content type of the client content as a second criterion for selecting the first user engagement content.

In one embodiment, processor 104 may function as exemplary determination logic for determining a predicted processing time length for the content server to process the uploaded client content; processor 104 may function as exemplary second selection logic for selecting a second user engagement content, wherein the second user engagement content has a second presentation time length that is equivalent to the predicted processing time length, and wherein the second presentation time length is used as a primary criterion for selecting the second user engagement content; and processor 104 and network interface 130 may function as exemplary second transmission logic for transmitting the second user engagement content from the content server to the client computer, wherein the second user engagement content is displayed on the client computer while the content server is processing the uploaded client content.

Note that the hardware described as exemplary logic for the functions described above are merely exemplary, and other hardware/software shown in FIG. 1 may be utilized to provide the same described and other logic necessary to perform the processes described herein by the present invention.

Figure 2:
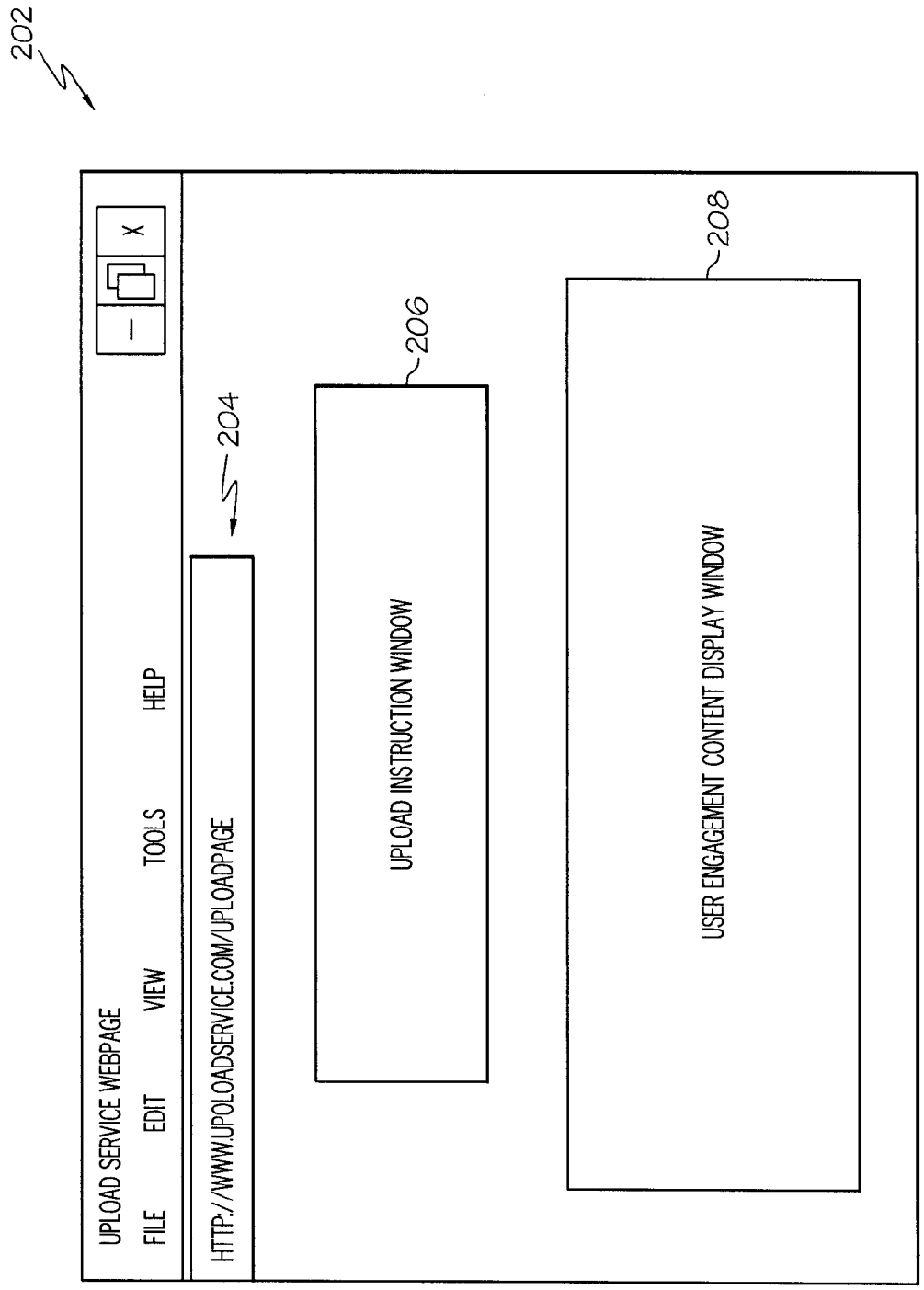
FIG. 2 illustrates an exemplary graphical user interface (GUI) that is presented to a client computer while the client computer uploads content to a content server.

With reference now to FIG. 2, an exemplary graphical user interfaced (GUI) 202 that may be presented to a client computer (e.g., on a display 110 at client computer 152 shown in FIG. 1) by a content server (e.g., content server 102 shown in FIG. 1). As suggested by the uniform resource locator (URL) pane 204, a user has accessed an upload service. This upload service allows the user to upload content such as videos, photographs, text documents, presentation slides, etc. to a content server, which then can selectively share the uploaded content with other users/computers. The upload service may present an upload instruction window 206 to the user, which walks the user through steps required to upload the content. In a manner described in exemplary embodiments depicted below in FIG. 3, the upload service, via its content server, provides user engagement content to the client computer, such that the user can view the user engagement content on a user engagement content display window 208 while his content is being uploaded to and/or processed by the content server. The term "user engagement content" is used to suggest that the user is "engaged" in the engagement content, such that his interest is captured by and his focus is directed to the engagement content. Examples of such user engagement content include, but are not limited to, advertisement videos, instructional videos on how to utilize services offered by the upload service, really simple syndication (RSS) feeds selected by the user, text documents, or any other content that is provided from the content server in accordance with parameters and procedures described below.

Figure 3:
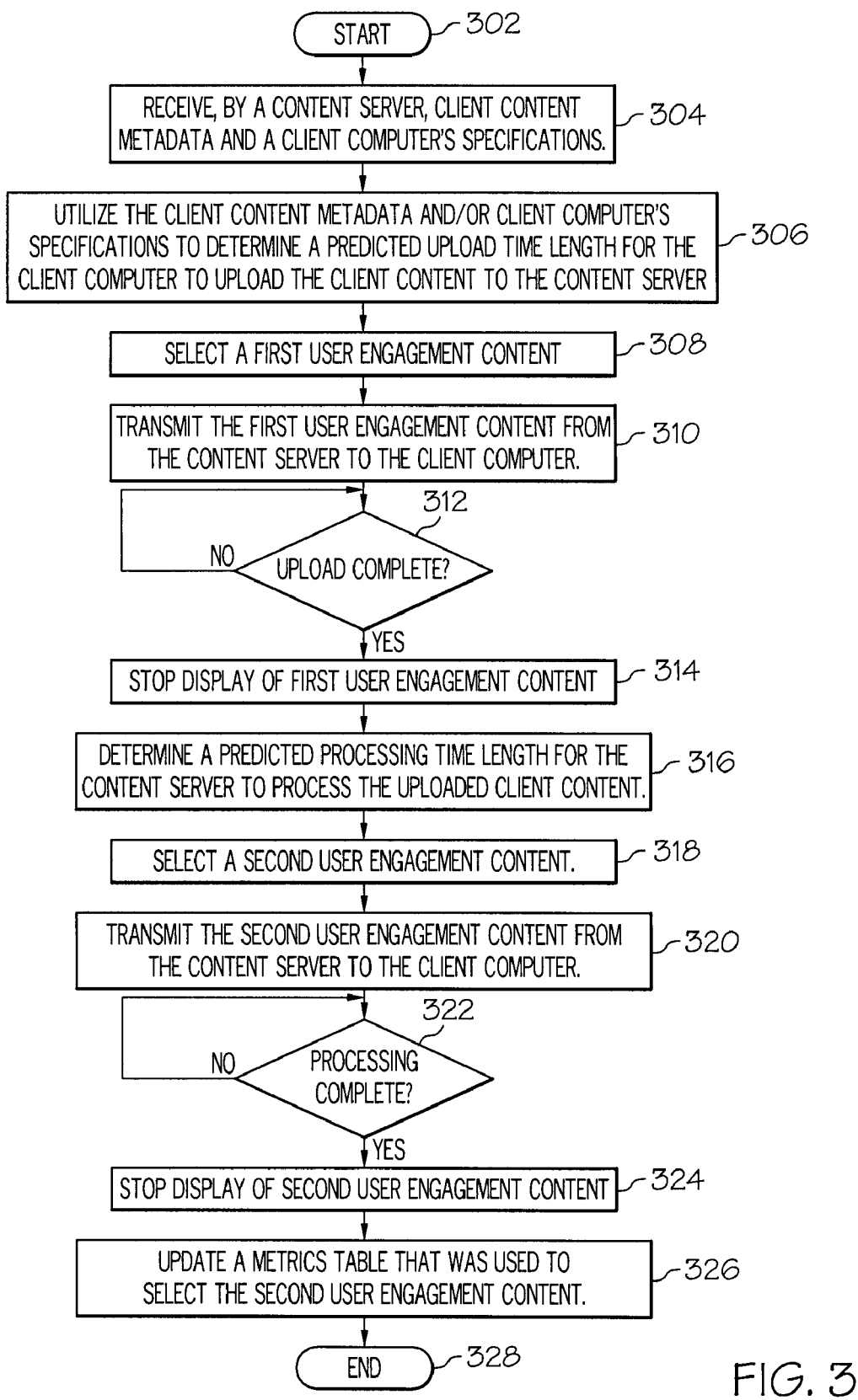
FIG. 3 is a high-level flow-chart of exemplary steps executed by a processor to manage a presentation of user engagement content to the client computer during an upload of content from the client computer to a content server.

Referring now to FIG. 3, a high level flow chart of exemplary steps taken to present the user engagement content described in FIG. 2 is presented. After initiator block 302, which may be initiated by a user initiating an upload of content to an upload service (which permits a sharing of content to multiple subscribers/requesters), a content server that is managed by the upload service receives client content metadata (block 304). The client content metadata describes client content that is to be uploaded from the client computer to the content server. In one embodiment, this client content metadata includes, but is not limited to, the size of the client content that is to be uploaded (e.g., how many kilobytes or megabytes of data/content make up the client content), what type of client content is being uploaded (e.g., a text document, a digital video clip, a digital photograph, a digital audio file, etc.), the format of the client content (e.g., joint photographic experts group-JPEG, moving picture experts group-MPEG, MPEG-1 audio layer 3-MP3, etc.), etc.

As further depicted in block 304, the content server may receive a client computer's specifications that describe the client computer that is uploading the client content. Examples of computer parameters found within this client computer's specifications include, but are not limited to, the data transfer rate (speed) of the Internet connection between the client computer and the content server, the central processing unit (CPU) clock speed of the client computer, current CPU usage (load) for the client computer, the speed of the network interface card (NIC) of the client computer (shown generally as network interface 130 in FIG. 1), and any other parameter that can be used to determine how fast/slow the client computer will be when uploading content to the content server.

As described in block 306, the content server is then able to predict an upload time length for how long it will take the client computer to upload the client content to the content server. In one embodiment, this predicted upload time length is initially calculated using the client content metadata, such that the predicted upload time length is based solely on the size of the client content to be uploaded. Thus, a large file will take longer to upload than a smaller file. In one embodiment, this predicted upload time length can be refined to create a refined predicted upload time length that is further based on the client computer's specifications. Thus, a fast computer will upload the client content in less time than a slower computer.

Based on the predicted upload time length and/or refined predicted upload time length, a first user engagement content is selected (block 308). This first user engagement content has a first presentation time length that is equivalent to the predicted upload time length and/or refined predicted upload time length. The term "equivalent" is defined as the first presentation time length being approximately equal to the predicted upload time length. For example, assume that there are four video clips available to the content server to be used as first user engagement content. The four video clips are respectively 30 seconds, 60 seconds, 5 minutes, and 10 minutes in length. If the client content will take 55 seconds to upload, then the 60 second user engagement content is selected to be transmitted to the client computer while the client content is being uploaded from the client computer to the content server (block 310).

Once the upload of the client content is complete (query block 312), then the content server or the client computer can optionally stop the display of the first user engagement content (block 314), thereby giving the user an indication that the upload has completed. Otherwise, the operation describe in block 312 can be ignored (skipped), and the first user engagement content can continue until it has been completely shown.

After the client content has been uploaded to the content server, the content server may need to process the uploaded client content. If so, then the content server determines how long it will take the content server to perform this processing (block 316). This determination of a predicted processing time length may be performed by examining a current workload that is being imposed on the content server by other client computers uploading their own content, the speed/memory/bandwidth of the content server, the size/type of uploaded client content from the client computer who just finished uploading his content, etc. In one embodiment, this predicted processing time length may be determined by using metrics from a metrics table that is managed by the content server. The metrics table contains an historical record of how long it took to process uploaded files in the past. Parameters stored within the metrics table include, but are not limited to, the size of previously uploaded client contents, the type of previously uploaded client contents (from the present client computer and/or from other client computers), the resource usage of the content server (i.e., how much CPU power, bandwidth, memory was available when processing a particular size/type of uploaded client content), etc. As described in block 326, this metrics table is updated after completing the processing of every upload to the content server.

Once a predicted processing time length is determined, the content server selects a second user engagement content (block 318) that is to be transmitted to the client computer for the user to view while his just-uploaded client content is being processed by the content server (block 320). Processing of the uploaded client content by the process server includes, but is not limited to, assigning tags and metadata to the uploaded client content, assigning file addresses to the uploaded client content, transforming the uploaded client content from one format into another (e.g., from MP3 into a proprietary audio format; from an uncompressed to a compressed format; etc), etc. Once the content server finishes processing the uploaded client content (query block 322), display of the second user engagement content on the client computer may be stopped by the client computer and/or the content server (block 324). The process ends at terminator block 328.

Note that in one embodiment, the first user engagement content and the second user engagement content are a same user engagement content. If so, then this same user engagement content is selected according to the process described above, and is sent to the client computer before the client content is uploaded to and/or processed by the content server. Thus, by predictively determining how long it will take both to upload the client content and to subsequently process the uploaded client content, then a single user engagement content can be presented to the user for viewing during both the uploading and processing operations.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), and writable storage media (e.g., hard disk drive, read/write CD ROM, optical media). It should be understood, therefore, that such storage media when encoded with computer readable instructions that direct method functions in the present invention, represent alternative embodiments of the present invention. Further, it is understood that the present invention may be implemented by a system having means in the form of hardware, software, or a combination of software and hardware as described herein or their equivalent.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA. Applying the VHDL instructions to the VHDL chip not only causes a physical transformation of the VHDL chip, but such VHDL instruction application can also cause a specifically loaded VHDL chip to be newly coupled (physically and/or logically) to other hardware within a computer system, thus causing an additional physical transformation of the computer system.

Having thus described the invention of the present application in detail and by reference to illustrative embodiments thereof, it will be apparent that modifications and variations are possible without departing from the scope of the invention defined in the appended claims.

What is claimed is:

1. A computer-implemented method of receiving an upload from a client computer, the computer-implemented method comprising:

executing instructions on a processor in a content server, wherein the instructions, when executed, perform a process comprising:

receiving client content metadata, wherein the client content metadata describes a size of a client content that is to be uploaded from a client computer to the content server, and wherein the client content metadata further describes a content type of the client content, wherein the content type is from a group consisting of a text document, a digital video clip, a digital photograph, and a digital audio file;

utilizing the client content metadata to determine a predicted upload time length for the client computer to upload the client content to the content server;

utilizing the content type of the client content as a first selection criterion for selecting a user engagement content;

determining a predicted processing time length for the content server to process the client content, wherein processing the client content comprises assigning tags and metadata to the client content and transforming the client content from one format into another;

selecting the user engagement content based on the content type of the client content, the predicted upload time length for the client computer to upload the client content to the content server, and the predicted processing time length for the content server to process the client content, wherein the user engagement content has a presentation time length that is equivalent to the predicted upload time length plus the predicted processing time length, and wherein the content type of the client content matches a content type of the user engagement content; and transmitting the user engagement content from the content server to the client computer, wherein the user engagement content is displayed on the client computer while the client computer is uploading the client content to the content server.

2. The computer-implemented method of claim 1, further comprising:

receiving a client computer's specifications for the client computer, wherein parameters found within the client computer's specifications comprise a data transfer rate of an Internet connection between the client computer and the content server, and a central processing unit (CPU) clock speed of the client computer;

utilizing the client computer's specifications to determine a refined predicted upload time length for uploading the client content; and utilizing the refined predicted upload time length as a second selection criterion for selecting the user engagement content.

3. The computer-implemented method of claim 1, wherein the predicted processing time length is determined using metric values from a metrics table, and wherein the metrics table comprises a historical record of the content server's processing times for processing previously uploaded client contents.

4. The computer-implemented method of claim 1, further comprising:

in response to determining that said uploading the client content to the content server is complete, stopping a display of the user engagement content.

5. The computer-implemented method of claim 3, wherein the previously uploaded client contents were all uploaded from the client computer.

6. A computer readable storage medium, wherein the computer readable storage medium comprises computer executable instructions that, when executed:

receive client content metadata, wherein the client content metadata describes a size of a client content that is to be uploaded from a client computer to the content server, and wherein the client content metadata further describes a content type of the client content, wherein the content type is from a group consisting of a text document, a digital video clip, a digital photograph, and a digital audio file;

utilize the client content metadata to determine a predicted upload time length for the client computer to upload the client content to the content server;

utilize the content type of the client content as a first selection criterion for selecting a user engagement content;

determine a predicted processing time length for the content server to process the client content, wherein processing the client content comprises assigning tags and metadata to the client content and transforming the client content from one format into another;

select the user engagement content based on the content type of the client content, the predicted upload time length for the client computer to upload the client content to the content server, and the predicted processing time length for the content server to process the client content, wherein the user engagement content has a presentation time length that is equivalent to the predicted upload time length plus the predicted processing time length, and wherein the content type of the client content matches a content type of the user engagement content; and transmit the user engagement content from the content server to the client computer, wherein the user engagement content is displayed on the client computer while the client computer is uploading the client content to the content server.

7. The computer readable storage medium of claim 6, further comprising computer executable instructions that, when executed:

receive a client computer's specifications for the client computer, wherein parameters found within the client computer's specifications comprise a data transfer rate of an Internet connection between the client computer and the content server, and a central processing unit (CPU) clock speed of the client computer;

utilize the client computer's specifications to determine a refined predicted upload time length for uploading the client content; and utilize the refined predicted upload time length as a second selection criterion for selecting the user engagement content.

8. The computer readable storage medium of claim 6, wherein the computer executable instructions are downloaded to the computer readable storage medium from a software deploying server in an on-demand basis.

9. A system comprising:

first receiving hardware logic for receiving client content metadata, wherein the client content metadata describes a size of a client content that is to be uploaded from a client computer to the content server, and wherein the client content metadata further describes a content type of the client content, wherein the content type is from a group consisting of a text document, a digital video clip, a digital photograph, and a digital audio file;

first utilization hardware logic and determination hardware logic for:

utilizing the client content metadata to determine a predicted upload time length for the client computer to upload the client content to the content server;

utilizing the content type of the client content as a first selection criterion for selecting a user engagement content; and determining a predicted processing time length for the content server to process the client content, wherein processing the client content comprises assigning tags and metadata to the client content and transforming the client content from one format into another;

selection hardware logic for selecting the user engagement content based on the content type of the client content, the predicted upload time length for the client computer to upload the client content to the content server, and the predicted processing time length for the content server to process the client content, wherein the user engagement content has a presentation time length that is equivalent to the predicted upload time length plus the predicted processing time length, and wherein the content type of the client content matches a content type of the user engagement content; and transmission hardware logic for transmitting the user engagement content from the content server to the client computer, wherein the user engagement content is displayed on the client computer while the client computer is uploading the client content to the content server.

10. The system of claim 9, further comprising:

second receiving hardware logic for receiving a client computer's specifications for the client computer, wherein parameters found within the client computer's specifications comprise a data transfer rate of an Internet connection between the client computer and the content server, and a central processing unit (CPU) clock speed of the client computer;

second utilization hardware logic for utilizing the client computer's specifications to determine a refined predicted upload time length for uploading the client content; and third utilization hardware logic for utilizing the refined predicted upload time length as a second selection criterion for selecting the first user engagement content.

11. The system of claim 9, wherein the predicted processing time length is determined using metric values from a metrics table, and wherein the metrics table comprises a historical record of the content server's processing times for processing previously uploaded client contents.

* * * * *